United States Patent [19]

Troutman et al.

[11] Patent Number: 4,663,601

[45] Date of Patent: May 5, 1987

[54] MAGNETIC SWITCH HOUSING ASSEMBLY

[75] Inventors: Paul H. Troutman, Cincinnati; Eddie D. Lester, Blanchester; William G. Sonderman, Cincinnati, all of Ohio

[73] Assignee: Xomox Corporation, Cincinnati, Ohio

[21] Appl. No.: 673,885

[22] Filed: Nov. 21, 1984

[51] Int. Cl.$^4$ ............................................. H01H 9/00
[52] U.S. Cl. ............................ 335/207; 340/870.31; 324/208
[58] Field of Search .................... 335/207, 206, 205; 200/82 E, 83 L; 340/870.31; 324/174, 208

[56] References Cited

U.S. PATENT DOCUMENTS

| | | |
|---|---|---|
| 3,522,596 | 8/1970 | Fowler et al. |
| 3,538,948 | 11/1970 | Nelson |
| 3,602,254 | 8/1971 | Fawkes |
| 3,719,203 | 3/1973 | Wettre |
| 3,719,887 | 3/1973 | Shimizu et al. ............ 335/207 X |
| 3,789,875 | 2/1974 | McGee |
| 4,004,560 | 1/1977 | Brungsberg ............ 335/206 X |
| 4,086,456 | 4/1978 | Bone |
| 4,093,000 | 6/1978 | Poff |

Primary Examiner—L. T. Hix
Assistant Examiner—Brian W. Brown
Attorney, Agent, or Firm—Frost & Jacobs

[57] ABSTRACT

A housing assembly for a magnetically controlled element used to detect the angular position of a rotatable shaft includes at least one cavity for holding a corresponding number of insertable switch capsules, which capsules are preferably removable. The capsules are readily fitted in the cavities to precisely position a magnetic reed switch encapsulated therein into close proximity to a rotating shaft having a magnetic insert on at least one circumferential sector. The capsules also optionally include reed switch activated SCR circuits for generating an AC power output signal dependent upon the angular position of the rotatable shaft.

45 Claims, 7 Drawing Figures

MAGNETIC SWITCH HOUSING ASSEMBLY

TECHNICAL FIELD

The invention relates generally to magnetic switches and more particularly to a housing assembly for environmentally isolating and securely mounting one or more magnetic switches in a predetermined fixed relationship to an actuating shaft. The invention will be specifically disclosed in connection with a housing for precisely mounting two limit switch modules positioned to magnetically detect the open and closed positions of a quarter turn actuating shaft.

BACKGROUND OF THE INVENTION

Normally, visual access to a closure member of a valve is blocked by the valve housing and by the process line or equipment in which the valve is installed. Further, in many instances, the valve is inconveniently located, and there is a need to ascertain the position of the valve closure member at a location removed from the valve. For these reasons, many prior art devices have been developed for not only detecting the position of a valve closure member, but also for electrically communicating such information to a remote location.

Perhaps the most common contemporary commercial practice is to use detectors which sense the end limits of the closure member movement and which open or close an electrical switch in response thereto. Typically, the closure member is moved by an actuating shaft which extends through an actuator housing. In one prior art arrangement, this extesion of the actuating shaft out of the actuator housing is used to mechanically interconnect the closure member with a pair of rocker arms actuated limit switches. The actuating shaft moves the rocker arms at the end limits of closure member movement; and the movement of the rocker arms is used to open or close electrical contacts. The contacts, in turn, open or close an electrical circuit to produce an output signal indicative of whether the closure member is in an open or closed position.

While used quite extensively, mechanically actuated limit switches, such as the rocker arm type switches discussed above, suffer from several shortcomings which limit their effectiveness in many industrial environments. First of all, these prior art switches are often insufficiently sealed (if sealed at all). As a consequence, the switch contacts occasionally malfunction due to exposure to dirt and/or process materials. Additionally, the rocker arms, or other mechanical components, of these prior art switches are many times directly exposed to process material spills. Many such process materials are corrosive and will corrode the mechanical components or inhibit their mechanical movement. For example, viscous fluids, such as corn syrup, may spill and "gum up" rocker arms to such an extent as to prohibit switch operation.

Mechanically actuated limit switches are also susceptible to mechanical abuse. It is not uncommon, as an example, for workers to climb upon or step on limit switches as they attempt to access other process equipment components. The weight of a typical worker may well bend the rocker arms of the above described limit switches and render such switches inoperative.

The size of mechanical limit switches also poses limitations upon their use. Mechanical limit switches generally extend above valve actuators and have relatively high profiles. On occasion, such as when other process equipment or low ceiling dimensions must be taken into consideration, these high profiles restrict placement of the actuator.

It is also known in the art to detect the position of a valve closure member with magnets and one or more magnetic reed switches. One of either the magnets or the reed switches is positioned to move with the closure member, with the other positioned on the valve body. For example, in U.S. Pat. No. 3,538,948 to Nelson et al, a gate valve is disclosed wherein permanent magnets are affixed to the movable gate member. A non-movable sleeve member containing a pair of upper and lower spaced magnetic reed switches is disposed within the gate member. As the gate member is moved between open and closed positions, the permanent magnets affixed thereto are transported in proximity to the reed switches so as to cause the reed switches to close and to complete an electrical circuit. The magnets and reed switches are positioned to bring the magnets in close proximity with the lower reed switch when the gate member is in the closed position and to bring the magnets in proximity with the upper reed switch when the gate member is in the open position.

A similar arrangement wherein magnets and magnetic reed switches are used to detect the position of a gate valve member is disclosed in U.S. Pat. No. 3,789,875 to McGee. In McGee, upper and lower reed switches attached to the valve body are activated by magnets embedded in a tubular actuating stem for the gate member.

In U.S. Pat. No. 4,093,000 to Poff, magnets are supported within a tubular shell that raises, lowers and rotates with the valve stem of a rising stem valve. This movement of the tubular shell positions the magnets in proximity with reed switches affixed to a sleeve disposed with the shell to selectively activate the reed switches and to produce electrical signals indicative of the position of the valve closure member.

A removable position detection device for a valve is disclosed in U.S. Pat. No. 3,522,596 to Fowler et al. The Fowlder et al device includes a cylindrical sleeve portion connecting upper and lower circular plates adapted for attachment to the side of a valve body. Reciprocating movement of the valve actuating stem is used to rotate a cantilevered arm supporting a magnet on its free end. The rotational movement of the cantilevered arm moves the magnet over magnetic reed switches, which reed switches are fixedly mounted on a terminal board. In an arrangement for detecting the angular position of a rotating shaft, Fowler et al discloses a magnet secured to the shaft. The magnet is rotated past a plurality of spaced magnetic reed switches fixedly secured to a stationary plate.

The magnetic reed type limit switches described above has been subject to many of the same shortcomings previously discussed in connection with mechanically activated limit switches. The reed switches themselves are generally sealed hermetically. However, the connections between the reed switches and the attached conductors are exposed to dirt and other contaminants within the industrial environment. As previously noted, many of the potential contaminants are corrosive and exposure of these connections thereto may result in a malfunction.

Further, when the prior art valves containing reed switches are subjected to vibration over extended periods of time, the securement between the reed switches and the valves (or mounting plates) is subject to failure. Even slight relative movement between the valve and the reed switch may cause a system malfunction.

Additionally, precisely securing and positioning reed switches to valve bodies or mounting plates is a time consuming activity requiring tedious and precise manual labor. Hence, such reed switch securement adds considerable cost to the valve. Also, once the reed switches are secured, their position is not readily adjustable to vary the trip point at which the switch is actuated. Moreover, the valves using such switches are not completely interchangeable with similar valves without the switches; and retrofitting of existing valves is difficult.

SUMMARY OF THE INVENTION

Accordingly, it is a primary object of the invention to provide a magnetic switch assembly of improved reliability.

It is another object of the invention to provide a switch assembly for environmentally protecting one or more magnetic reed switches in an industrial environment.

Another object of the invention is to provide a rugged housing for protecting a magnetic switch against mechanical abuse.

Yet another object of the invention is to provide a housing for precisely positioning and securing one or more magnetic switches with respect to an actuating shaft.

A further object of the invention is to provide a housing assembly for one or more magnetic switches, which housing assembly includes multiple seals to protect the switching assembly from the ambient environment.

Another object of the invention is to provide a magnetic switch assembly with replaceable switch capsules.

A still further object of the invention is to provide a magnetic switch assembly which has independently adjustable trip points for detecting the position of an actuating shaft.

In accordance with another object of the invention, a magnetic switch assembly is provided having an output signal compatible with computers and programmable controllers.

In another aspect of the invention, a magnetic switch assembly is provided that may optionally be used for producing a power output signal for medium AC power applications.

Yet another aspect of the invention is to provide a magnetic limit switch assembly providing a visual indication of a sealed actuating shaft.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus is provided for indicating the position of a rotatable shaft. The apparatus is used in combination with a rotatable shaft having a magnetic insert disposed about at least one circumferential sector. A nonmagnetic housing having a bore is provided with the rotatable shaft disposed within said bore and rotatable with respect thereto. At least one cavity extends into the housing in proximal relationship to said bore with at least one capsule disposed within the cavity. A magnetically controlled element is disposed within the capsule. The magnetically controlled element is responsive to magnetic flux generated by the magnetic insert and has an output dependent upon the relative angular position between the shaft and the housing. A conductor is connected to the controlled element and extends out of the capsule for communicating the output of the controlled element to an external location. The capsule totally encapsulates the controlled element and the connection between the controlled element and the conductor. Means are also provided for selectively securing the capsule in the cavity in a predetermined relationship to the bore to maximize the influence of the magnetic flux generated by the magnetic insert upon the controlled element.

Preferably, at least two cavities and two capsules are provided within each housing, and the capsules are elongated and tangentially positioned with respect to the bore. In the preferred embodiment, the two cavities are orthogonally disposed with respect to both each other and to the bore.

In another aspect of the invention, the securing means includes at least one off-center locator pin extending from one axial end of each of the capsules. Each locator pin(s) is received by a corresponding locator cavity in the closed end of the cavities to prevent relative rotational movement between the capsule and the housing. When two locator pins are used, one of the pins is preferably larger than the other with the corresponding locator cavities being matingly configured to avoid insertion of the locator pins into the improper locator cavities.

In one specific aspect of the invention, the securing means further includes a self-locking external toothed ring in abutting relationship with each of the capsules to prevent relative axial movement between said capsules and said housing. The self-locking external toothed ring is in radially compressive relationship to the cavities.

In another aspect of the invention, the cavities are in different planes so as to avoid interference between the capsules and the conductors extending out of the capsules.

In yet another aspect of the invention, the open ends of the cavities are threaded, and a conduit fitting is threadably received in at least one of said open ends to sealingly close the open end in watertight relationship to the housing.

In a further and related aspect of the invention, a plug is threadably inserted in the open end of the other cavity to sealingly close the opening in a watertight and/or explosion proof seal.

Another feature of the invention involves the total encapsulation of a circuit board and a circuit controlled by the magnetically controlled element in the capsule.

In the preferred form of the invention, the magnetically controlled element includes a hermetically sealed reed switch.

In one optional aspect of the invention, the circuit includes a pair of silicon controlled rectifiers responsive to the reed switch.

In still another aspect of the invention, a bore cap seal is disposed at an axial end of the rotatable shaft. The bore cap seal is sealingly interconnected to the housing to prevent entry of contaminants into the housing bore. A visual indicator disc is fixed to the rotatable shaft to provide a visual indication of the angular position of the rotatable shaft through a window providing visual access to said visual indicator disc.

Most preferably, the switch capsule is formed of a waterproof material.

In still another aspect of the invention, at least one magnet holder is provided for securing a permanent magnet about a circumferential sector of the rotatable shaft. The magnet holder is adjustably movable with respect to the shaft for varying the angular position of the permanent magnet on said shaft.

Still other objects of the present invention will become readily apparent to those skilled in this art from the following description wherein there is shown and described a preferred embodiment of this invention, simply by way of illustration of one of the best modes contemplated for carrying out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrative several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
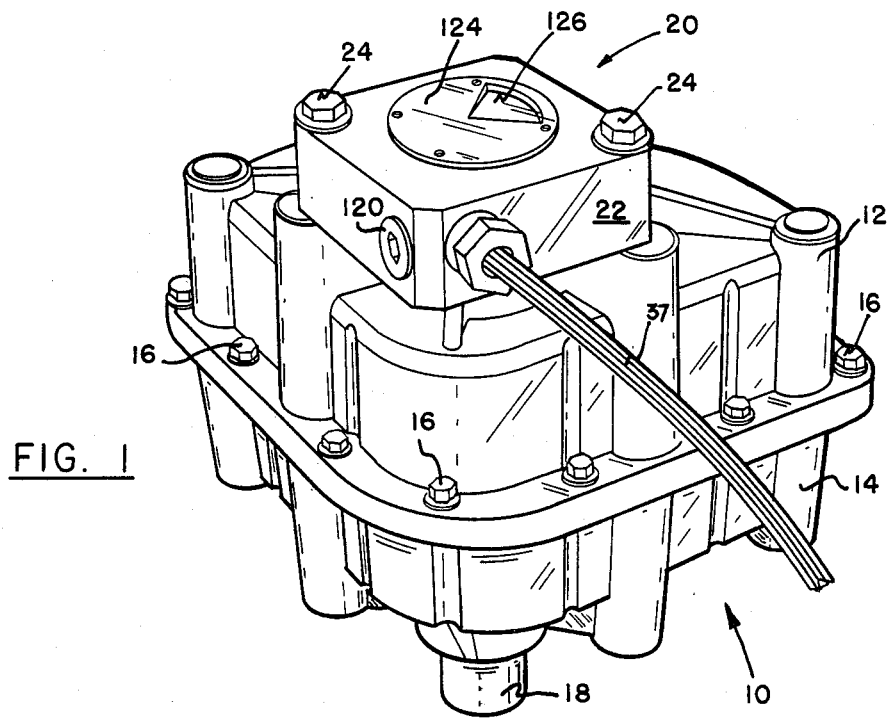
FIG. 1 is a perspective environmental view depicting a magnetic switch assembly constructed in accordance with the present invention and mounted on top of a vane type actuator housing.

Referring now to the drawings, FIG. 1 depicts a vane type actuator of the type commonly used for effectuating quarter turn rotational movement of a movable member, such as a valve closure member (not shown). The vane type actuator, generally designated by the numeral 10, includes upper and lower housing portions 12 and 14 secured together by a plurality of screws 16. A movable vane or paddle (not shown) is disposed within the housing 12,14 and arranged to rotate in response to a pressure differential developed by the introduction of pressurized fluid into the housing 12,14 on one side of the vane. The vane is fixedly attached to an actuating shaft 18 which extends through both the upper and lower housing portions 12,14 and rotates with the vane.

FIG. 1 further depicts a limit switch housing assembly, generally designated by the numeral 20, mounted on the top of the upper housing portion 12. The switch housing 20 has a centrally disposed bore into which the shaft 18 is received (the top portion of shaft 18 is obscured by the housing assembly 20 in FIG. 1, see FIG. 2). As illustrated, the housing assembly 20 includes a low profile housing 22 of generally rectangular configuration. The housing 22 is formed of nonmagnetic material, such as plastic, nonmagnetic stainless steel or, as in the preferred embodiment, an aluminum casting. The housing 22 is bolted to the upper housing portion 12 by a pair of bolts 24.

Figure 2:
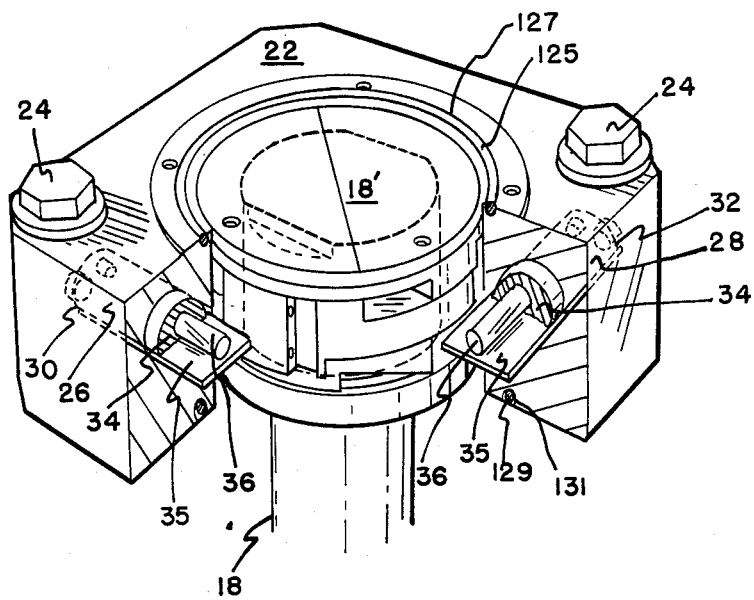
FIG. 2 is an enlarged perspective view of the magnetic switch assembly of FIG. 1, with a portion cut away to illustrate the relationship between actuating shaft, switch capsules and adjustable magnet holders disposed on the actuating shaft.

Turning now to FIG. 2, it is seen that a pair of epoxy potted switch capsules 26 and 28 are disposed within the housing 22. More specifically, the illustrated plastic switch capsules 26 and 28 are secured in closed ended drilled cavities 30 and 32 respectively formed in the housing 22, which cavities 30 and 32 have a configuration matching that of the respective switch capsules 26,28. Preferably, the switch capsules are tangentially oriented with respect to the shaft 18. In the specifically illustrated embodiment, the switch capsules 26,28 are orthogonally oriented with respect to both each other and to the rotary axis of an adaptor shaft 18' interconnected to and rotatable with the shaft 18. The illustrated shaft adaptor 18' is securable to the shaft 18 through the agency of a set screw 19 (see FIG. 3). Inasmuch as shaft adaptors (or shaft mounts) simply function in the present invention to effectively alter a shaft dimension for accommodating a standard size magnet holder (to be described hereinafter), unless otherwise explicitly noted, the term "shaft" as used in the present specification and claims will be used to denote either a shaft itself or any adaptor or extension thereof.

The switch capsules 26 and 28 each contain electronic circuits, including magnetically controlled elements, such as reed switches (schematically depicted in FIG. 7), for detecting the angular position of magnets adjustably fixed to the shaft 18, as will be more fully discussed hereinafter. As may be realized from FIG. 2, all of the circuit components are either double or triple sealed. The housing 22 provides a first seal and isolates the entire switch modules 26 and 28 from dirt and process contaminants. Additionally, the switch capsules 26, 28 themselves include an epoxy covering 34. This covering 34 provides a second seal which encapsulates both the magnetic reed switches and circuit boards 35 containing associated electronic circuit elements. Insulated conductors 37 (see FIGS. 1, 5, and 6) extend through the capsules 26,28 to apply an output signal from the encapsulated circuit to an external location, the connection between the encapsulated circuit and the conductors 37 also being disposed within the protective confines of the capsules 26,28. Further, the reed switches are hermetically sealed in a glass enclosure 36. Thus, the reed switch contacts are triple sealed from dirt and corrosion by the glass 36, epoxy 34 and housing 22; and all other circuit components and connections are double sealed by the epoxy covering 34 and housing 22. The reed switches and associated elements are described in greater detail below in connection with FIG. 7.

Figures 3, 4:
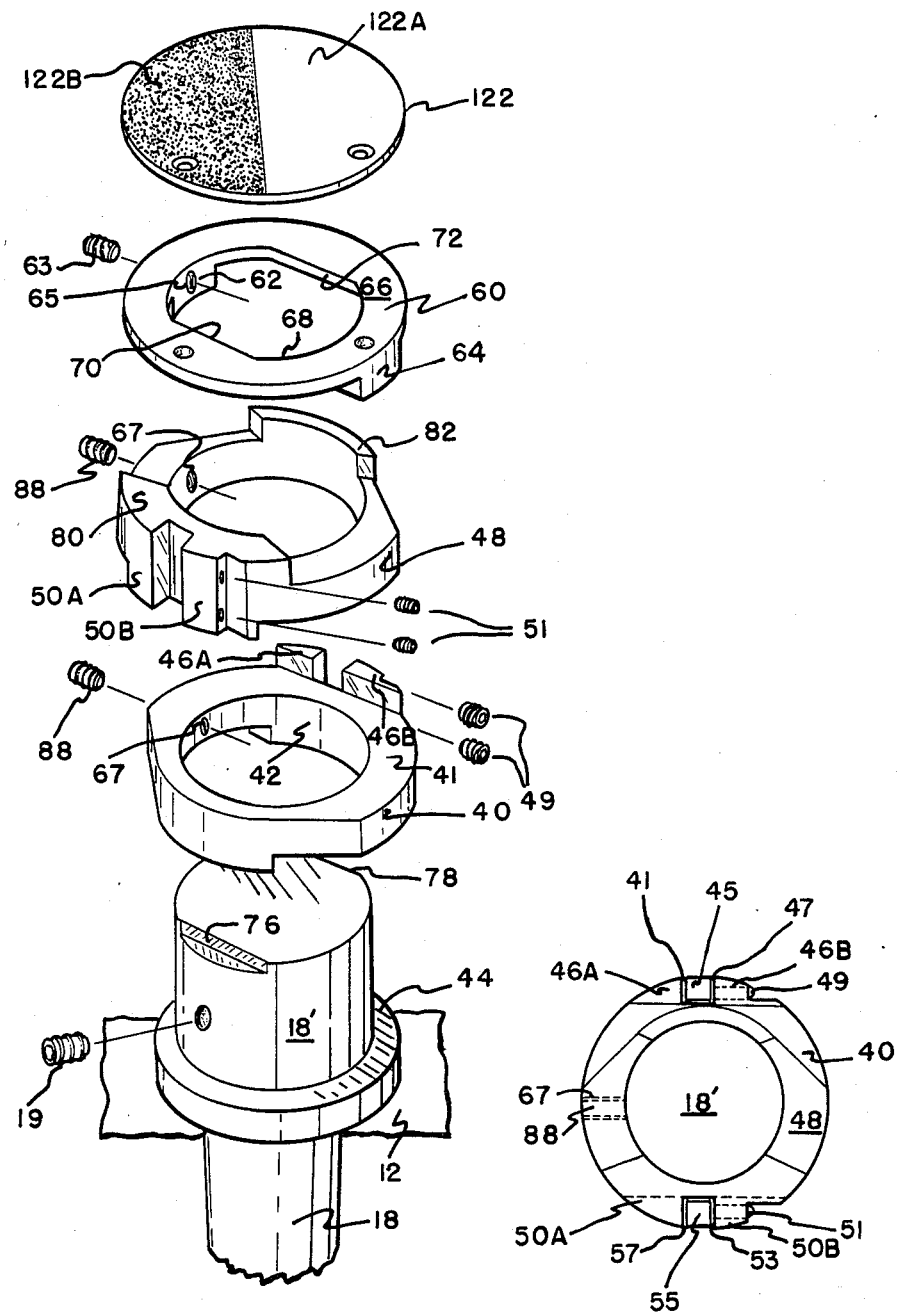
FIG. 3 is an exploded view depicting the actuating shaft, adjustable magnet holders and shaft position indicators shown in FIG. 2.
FIG. 4 is a plan view of the two magnet holders illustrated in FIG. 3 in assembled position and depicting the manner in which relative rotational movement between the two magnet holders is controlled.

Turning now to FIG. 3, the assembly depicted in FIG. 2 for adjustably holding magnets about the shaft 18 (or as specifically illustrated, a shaft adaptor 18') is illustrated in greater detail. A first magnet holder 40 having a centrally disposed shaft receiving aperture 42 is fitted about the upper section of the shaft 18 (or shaft adaptor 18'), which shaft section 18 extends through the upper housing portion 12. A shoulder 44 on the shaft 18 (specifically illustrated as the shaft adaptor 18') limits axial movement of the magnet holder 40 onto the shaft 18. The illustrated magnet holder 40 includes a bearing surface 41 on one axial side as well as a pair of cooperating magnet mounts 46A and 46B disposed on one circumferential sector. As described in connection with FIG. 4, a magnet 45 is disposed between these magnet mounts 46A and 46B. For clarity of illustration, the magnet 45 (as well as magnet 55 disposed between magnet mounts 50A and 50B of magnet holder 48, described hereinafter) is omitted from the drawings of FIGS. 2 and 3.

A second magnet holder 48 is fitted about the shaft 18 on top of the first magnet holder 40. This second illustrated magnet holder 48 is identical to the first illustrated magnet holder 40. However, in assembled positions, the second magnet holder 48 is inverted with respect to the first magnet holder 40 so as to position the axial bearing surface (not shown) on this second magnet holder 48 into contact with the corresponding bearing surface 41 of magnet holder 40. Magnet holder 48 further includes a pair of cooperating magnet mounts 50A and 50B which are illustrated as being separated from magnet mounts 44 and 46 by approximately 180° in FIG. 3.

An indicator clamping member 60 is fixedly secured to the shaft 18 above the second magnet holder 48. This indicator clamping member 60 includes a pair of downwardly depending bosses 62 and 64 extending from a base 66 having a ringlike configuration. The base 66 defines a central opening 68 which includes a pair of oppositely disposed flats 70 and 72. The ringlike base 66 is fitted about the top of shaft 18 (specifically illustrated as the shaft adaptor 18' in FIG. 3) with the flats 70 and 72 on indicator clamping member 60 engaging corresponding flats 76 and 78 on the sides of shaft 18 to prevent relative rotation between the indicator clamping member 60 and the shaft 18.

The boss 62 has a threaded apertures 65 for receiving a set screw 63 for selectively fixing the indicator clamping member 60 to the shaft 18. Similarly, threaded apertures 67 (see FIG. 4) in the magnet holders 40, 48 receive set screws 88 for securing the magnet holders 40,48 at a selected angular position about shaft 18.

As seen in FIG. 4, magnet mounts 46A and 46B on magnet holder 40 are used to securely hold a permanent magnet 45. The magnet 45 is interposed between a pair of magnetic pole pieces 41 and 47 which serve to directionalize the magnetic flux generated by magnet 45. A pair of set screws 49 extend through mount 46B to engage the pole piece 47 and to compressingly hold the magnet 45 between the magnetic pole pieces 41 and 47. In a similar manner, magnet mounts 50A and 50B are used to securely hold a permanent magnet 55 on magnet holder 48. A pair of set screws 51 are advanced through mount 50B to compressingly engage a magnetic pole piece 53 and to secure magnet 55 between pole piece 53 and a further pole piece 57. The magnet holders 40,48 radially separate the magnets 45,55 from the shaft 18 and permit the use of a shaft 18 formed of magnetic material without adversely effecting operation of the reed switches disposed in capsules 26,28.

Figure 5:
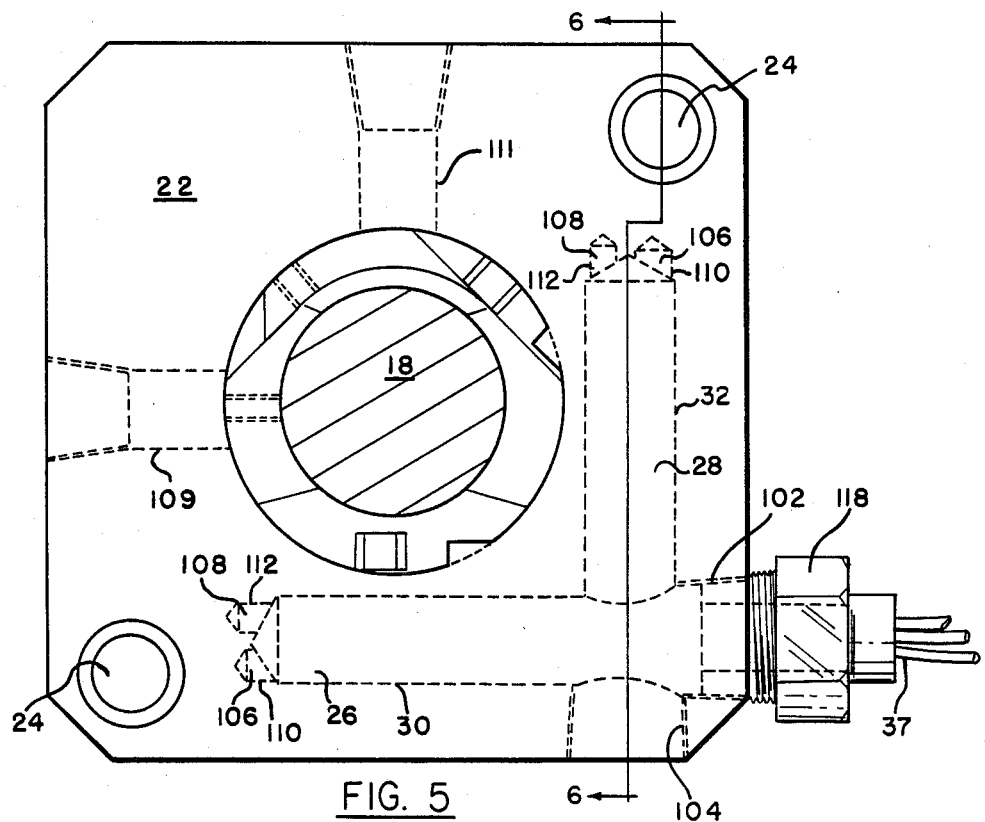
FIG. 5 is a plan view of the magnetic switch assembly of FIGS. 1 and 2 depicting position pins on the switch capsules for insuring proper and precise alignment of the switch capsules in the housing assembly.
Figure 6:
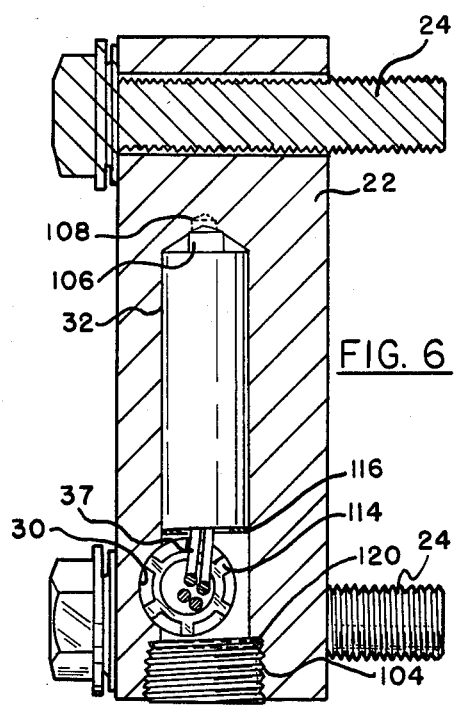
FIG. 6 is a cross-sectional view taken along line 6—6 in FIG. 5 showing the switch capsules operatively positioned in the housing assembly.

The orientation of the switch capsules 26,28 with respect to each other and the actuating shaft 18 is achieved in a manner illustrated in FIGS. 5 and 6. In FIG. 5, it is seen that the cavities 30 and 32 intersect each other near one corner of the generally rectangular housing 22. The switch capsules 26 and 28 are inserted into these cavities 30 and 32 through openings 102 and 104 respectively, which openings 102,104 are proximally located with respect to this corner location. As further depicted in FIGS. 5 and 6, each of the switch capsules 26,28 has at least one off-center pin extending outwardly from one axial end of the switch capsules. In the illustrated embodiment, each capsule 26,28 has a pair of locator pins 106,108. The diameter of locator pin 106 is greater than the diameter of pin 108. The axial end of cavities 30 and 32 have correspondingly sized and shaped locator holes 110,112 for receiving these locator pins. Thus, locator pin 106 will not fit into hole 112. In this way, the cavities 30,32 insure proper location of the switch capsules 26,28 with respect to the shaft 18, and the receipt of locating pins 106,108 in locator holes 110,112 insures proper angular orientation.

Switch capsules 26 and 28 are axially held in cavities 30,32 by self-locking external toothed rings 114 and 116 respectively. The rings 114,116 each have central openings for the passage of two insulated conductors 37 extending from each of the switch capsule 26,28. All of the conductors 37 exit housing 22 through a sealed fitting 118 (see FIG. 5) threadably received in the opening 102. As indicated from the depiction of FIG. 6, opening 104 is also threaded and is blocked by a cap 120. FIG. 6 further shows that the cavity 30 is vertically offset (i.e., in a different plane) from cavity 32 in the preferred embodiment to allow insertion of the second inserted switch capsules 26,28 without interference from the conductors 37 extending from the first inserted capsule.

Advantageously, the above described switch housing assembly is also explosion proof. The structural integrity of the housing 22 combined with the threaded openings 102,104 insure that any explosive gases within the cavities 30,32 would slowly escape about the threads of the openings 102,104 without exploding the housing 22. The relatively slow escape of gases about these threads provides cooling time for the heated gas and avoids the expulsion of the gases in a highly heated state.

Returning once again to FIG. 3, it is seen that a visual indicator disc 122 is fixedly attachable to the top of the indicator clamping member 60 for rotation with the actuating shaft 18. The visual indicator disc 122 is divided into two visually distinct areas 122A and 122B. A bore cap seal cover 124, shown in FIG. 1 covers the visual indicator disc 122 and sealingly isolates the shaft 18 and magnet holding assembly from the ambient environment. The bore cap seal 124 preferably seals against an O-ring 125 circumferentially disposed in an annular groove 127 in the top of housing 22 (see FIG. 2). A further O-ring 129 is disposed in a groove 131 for sealingly interfacing the bottom portion of the housing 22. The bore cap seal 124 is shown with a plastic window 126 which visually reveals a portion of the indicator disc 122. In the illustrated embodiment, the angular orientation of the seal cover 124 and disc 122 are coordinated so that one of the visually distinct areas 122A or 122B underlies the window 126 when the valve closure is in an open position and the other visually distinct area 122A or 122B underlies the window when the closure member is in the closed or shut position. The visually distinct areas 122A and 122B may include labels, as for example, the words "open" and "shut".

According to another feature of the invention, the relative angular positions of magnets 45,55 with respect to shaft 18 may be varied. As seen in FIG. 5, the housing 22 further includes a pair of ports 109 and 111 which extend radially inwardly to the centrally disposed bore containing shaft 18. These ports 109,111 provide access to set screws 88, shown in FIGS. 3 and 4, securing magnet holders 40,48 in selected angular position on the shaft 18. The set screw 88 may be loosened and retightened following angular adjustment of the magnet holder. The external openings of ports 109,111 are, of course, sealed during operation. Preferably, removably threaded caps are used to seal these external openings of ports 109 and 111.

Figure 7:
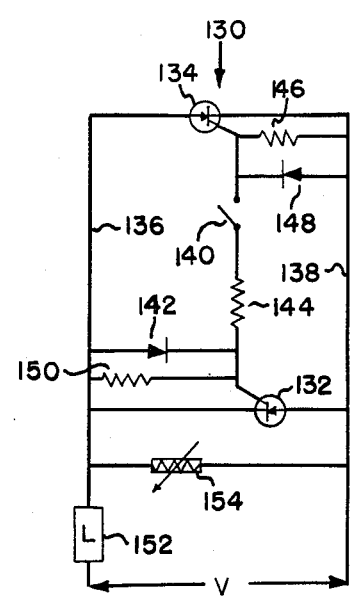
FIG. 7 is a schematic representation of a reed switch triggered solid state switching circuit disposed in each of the capsules of FIG. 6.

FIGS. 7 depicts a reed switch triggered switching circuit which is optionally disposed within each of the capsules for medium AC power applications. Such a circuit generates an output signal in response to the closure of a reed switch disposed within the glass enclosure 36 shown in FIG. 2. The specifically illustrated circuit 130 includes a pair of silicon-controlled rectifiers (SCR's) 132 and 134 connected between upper and lower rails 136 and 138 in an inverse-parallel configuration. The circuit 130 is activated by the closure of one of the hermetically sealed reed switches 140, which, as indicated in the description above, are closed by the influence of magnets 45,55 secured about the shaft 18. Upon closure of the reed switch 140, positive half cycles of the AC line voltage (wherein rail 136 is positive with respect to lower rail 138) will cause SCR 134 to be triggered to the "on" or conducting state by a diode 142, a resistor 144 and a resistor 146 acting in combination. During negative half cycles of the AC line voltage (wherein the upper rail 136 is negative with respect to the lower rail 138), the SCR 132 is triggered to the "on" or conducting state by the application of a gating potential acting across diode 148, resistor 144 and resistor 150 in combination. Hence, the load 152 will be connected across the voltage V between upper and lower rails 136 and 138 respectively during positive half cycles by SCR 134 and during negative half cycles by SCR 132. Therefore, full wave power is applied to the load 152 to simulate a normal switch closure. A varistor 154 is also shown across rails 136,138 to protect against transients exceeding the peak line voltage potential.

The circuit 130 of FIG. 7 advantageously permits relatively high power AC switching with only a minimal volt-ampere switch load on the reed switch 140. Other solid state power switches for performing this same function will be apparent to those skilled in the art and may be used in accordance with the principles of the present invention. For example, a single triac static switch circuit or a transistor switch could be employed. However, for low power signals directed to programmable logic controllers, computers and the like, the magnetic reed switch is used directly without the remaining illustrated SCR components.

In summary, numerous benefits have been described which result from employing the concepts of the invention. The disclosed switch assembly facilitates quick and reliable insertion of a magnetic switch capsule in proper position and orientation with respect to a rotating shaft having a magnet disposed about one circumferential sector. Encapsulation of the magnetic switches and control circuits in watertight epoxy capsules and thereafter inserting these capsules into sealed cavities in the assembly housing provides multiple seals to isolate the switches, circuits and their connections against the many potentially harmful contaminants in an industrial environment. The magnets used to activate the magnetic switches are advantageously secured in adjustable magnet holders to vary the angular position of the shaft used to trip the magnetic switches. The switch capsules may also optionally encapsulate circuit components for generating a magnetic switch activated power output signal. The use of locator pins on the capsules with corresponding locator cavities insures quick and proper insertion of the capsules while preventing relative rotational movement between the capsules and the housing during operation. The use of a windowed bore cap seal eliminates entry of contaminants into the housing bore while still providing a visual indication of the shaft position. The switch capsules of the invention may be constructed to be readily removable for quick and inexpensive maintenance, if needed.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In combination with a rotatable shaft having a magnetic element disposed about at least one circumferential sector thereof for common rotational movement with the shaft, an assembly for determining the angular position of the rotatable shaft, comprising:
    (a) a non-magnetic housing formed of rigid material, said housing having a bore, said rotatable shaft being disposed within said bore and rotatable with respect thereto;
    (b) at least one cavity extending into said housing material, the longitudinal dimension of said cavity extending in a direction substantially transverse to the rotatable axis of said shaft and in proximal relationship to said bore;
    (c) at least one potted capsule insertably disposed within said cavity;
    (d) a magnetically controlled element disposed within said capsule, said magnetically controlled element being responsive to magnetic flux generated by said magnetic insert and having an output dependent upon the relative angular position between said shaft in said housing;
    (e) a conductor connected to said controlled element and extending out of said capsule for communicating the output of said controlled element to an external location, said capsule totalling encapsulating said controlled element and the connection between said controlled element and said conductor; and (f) means for selectively securing the capsule in the cavity in a predetermined relationship to said bore to maximize the influence of the magnetic flux generated by said magnetic insert upon said controlled element.

2. An assembly as recited in claim 1 wherein said capsule is removably disposed within said cavity.

3. An assembly as recited in claim 1 wherein said at least one cavity is elongated in a direction substantially perpendicular to the rotatable axis of said shaft and in tangential relationship to said bore.

4. An assembly as recited in claim 1 wherein said capsule is formed of plastic and is permanently potted in said cavity.

5. An assembly as recited in claim 1 further including a bore cap seal disposed at an axial end of the rotatable shaft, said shaft seal being sealingly interconnected to the housing to prevent entry of contaminants into the housing bore.

6. An assembly as recited in claim 5 further including a visual indicator disc movable with said rotatable shaft to provide a visual indication of the angular position of the rotatable shaft, said bore cap seal including a window providing visual access to said visual indicator disc.

7. An assembly as recited in claim 1 further including at least one magnet holder for securing a permanent magnet about a circumferential sector of the rotatable shaft, said magnet holder being adjustably movable with respect to the shaft for varying the angular position of the permanent magnet on said shaft.

8. An assembly as recited in claim 7 further including at least one port extending through the housing to said bore for accessing at least one magnet holder for varying the relative angular positions between said at least one magnet holder and said rotatable shaft.

9. An assembly as recited in claim 1 further including a second cavity extending into said housing in a direction substantially transverse to the rotatable axis of said shaft, a second potted capsule insertably disposed in said second cavity, said second cavity being angularly spaced about the periphery of said bore with respect to said at least one cavity and proximally positioned with respect to the bore, a second magnetically controlled element totally encapsulated within said second capsule, said second magnetically controlled element producing an output dependent upon the angular position of the shaft, and a second conductor extending into the second capsule in contact with the second magnetically controlled element for communicating the second element output to an external location, the connection between said second switch and said second conductor being encapsulated within said second capsule.

10. An assembly as recited in claim 9 wherein each of the cavities has one closed axial end and one open, but closable, axial end.

11. An assembly as recited in claim 10 wherein the securing means includes at least one off-center locator pin extending from one axial end of each of the capsules, said off-center locator pin being received by a corresponding locator hole in the closed end of the cavities to prevent relative rotational movement between the capsules and the housing.

12. An assembly as recited in claim 11 where said securing means includes a pair of spaced locator pins and a corresponding pair of locator holes.

13. An assembly as recited in claim 12 wherein one of the locator pins is larger than the other and the corresponding locator holes are matingly configured to avoid insertion of the locator pins into the improper locator holes.

14. An assembly as recited in claim 9 wherein the securing means further includes a self-locking external toothed ring in abutting relationship with each of the capsules to prevent relative axial movement between said capsules and said housing, said ring being in radially compressive relationship to said cavities.

15. An assembly as recited in claim 9 wherein the cavities are nonparallel to each other and in different planes so as to avoid interference between the capsules and the conductors extending out of the capsules.

16. An assembly as recited in claim 9 wherein the cavities intersect proximal to their open ends to permit conductors extending from each capsule to exit the housing through one of the open ends.

17. An assembly as recited in claim 9 wherein the open ends of the cavities are threaded and a conduit fitting is threadably received in at least one of said open ends to sealingly close said at least one open end in watertight relationship to said housing.

18. An assembly as recited in claim 17 wherein a plug is threadably inserted in the open end of the other cavity to sealingly close the opening of the other cavity in a watertight explosion proof seal.

19. An assembly as recited in claim 9 wherein said magnetically controlled element includes hermetically sealed reed switches, the hermetically sealed reed switches being encapsulated by potting material formed into a one-piece capsule, removably disposed in the said at least first and second elongated cavities.

20. An assembly as recited in claim 9 wherein at least one of the capsules further totally encapsulates a circuit board and a circuit controlled by the magnetic control element.

21. An assembly as recited in claim 20 wherein the circuit includes a solid state switching circuit responsive to the reed switch.

22. An assembly as recited in claim 9 wherein said capsules are formed of a waterproof material.

23. An assembly as recited in claim 9 wherein the open ends of the cavities are threaded and a fitting is threadably received in at least one of said open ends in an explosion proof seal.

24. An assembly as recited in claim 9 wherein the longitudinal axis of each of the cavities are positioned in different planes, which planes are in substantially parallel relationship to each other and substantially perpendicular to the rotatable axis of said shaft to allow noninterfering insertion of the switch capsules.

25. An assembly as recited in claim 9 wherein both said at least one cavity and said second cavity are each elongated with respect to their respective longitudinal dimensions, and tangentially positioned with respect to said bore.

26. An assembly as recited in claim 25 wherein said at least one cavity and said second cavity are orthogonally disposed with respect to both each other and to said bore.

27. An assembly as recited in claim 25 wherein said each of said said cavities has a generally cylindrical configuration, and said switch capsules have complementary configurations.

28. A limit switch housing assembly for determining the angular position of a rotatable shaft, comprising:

(a) a housing formed of nonmagnetic material, said housing having a bore extending therethrough for receiving a rotatable shaft;
(b) first and second elongated cavities extending into said housing, the longitudinal dimension of said cavities extending in a direction substantially transverse to the rotatable axis of said shaft and in spaced tangential positions about the periphery of said bore, each of said cavities having one closed axial end and one open but closable axial end;
(c) first and second elongated potted capsules respectively positioned within said first and second cavities in planes which are in substantially perpendicular relationship to the longitudinal axis of said bore;
(d) a magnetically responsive switch encapsulated in each of said capsules;
(e) means for preventing relative movement between said switches and said housing; and
(f) conductor means extending through the open axial end of at least one of said cavities and connected to the switches disposed within said capsules for electronically communicating between said switches and an external location, the connection between the magnetically responsive switches and the conductor means being totally encapsulated in the respective capsules.

29. An assembly as recited in claim 28 wherein said first and second capsules are removably disposed within said first and second cavities.

30. An assembly as recited in claim 28 wherein said first and second cavities intersect proximal to their open axial ends and wherein said conductor means extends through only one of the open axial ends into both said first and second capsules.

31. An assembly as recited in claim 28 further including at least one magnet holder for securing at least one permanent magnet about a circumferential sector of the rotatable shaft.

32. An assembly as recited in claim 28 further including a pair of magnet holders, each of said magnet holders being operative to secure at least one permanent magnet about a circumferential sector of the rotatable shaft, at least one of said magnet holders being adjustable with respect to the shaft for varying the angular position of at least one of the permanent magnets with respect to said shaft.

33. An assembly as recited in claim 32 further including at least one port extending radially through said housing to the bore, said at least one bore providing access to at least one of the magnet holders for adjusting the angular position of the at least one magnet holder with respect to the shaft.

34. An assembly as recited in claim 28 wherein said housing is formed of aluminum.

35. An assembly as recited in claim 28 wherein said housing is formed of plastic.

36. An assembly as recited in claim 28 wherein the capsules are formed from a plastic material.

37. An assembly as recited in claim 28 wherein the magnetically responsive switches are magnetic reed switches.

38. An assembly as recited in claim 28 wherein the first and second cavities are orthogonally oriented with respect to each other and to the bore.

39. An assembly as recited in claim 28 wherein the conductor means includes a solid state circuit responsive to the output of the magnetic reed switch for producing a power output that does not pass through said reed switch.

40. An assembly as recited in claim 28 wherein said housing is formed of nonmagnetic stainless steel.

41. An assembly as recited in claim 28 wherein said first and second capsules are formed of plastic and permanently potted in said first and second cavities.

42. In combination with a rotatable shaft having a magnetic element disposed upon at least one circumferential sector thereof for common rotational movement with the shaft, an assembly for determining the angular position of the rotatable shaft, comprising:
(a) a nonmagnetic housing having a bore, said rotatable shaft being disposed within said bore and rotatable with respect thereto;
(b) at least one cavity extending into said housing material in proximal relationship to said bore;
(c) at least one capsule insertably disposed within said cavity;
(d) a magnetically controlled element disposed within said capsule, said magnetically controlled element being responsive to magnetic flux generated by said insert and having an output dependent upon the relative angular position between said shaft and said housing;
(e) a conductor connected to said controlled element and extending out of said housing for communicating the output of said controlled element to an external location; and
(f) at least one magnetic holder for securing a permanent magnet about a circumferential sector of a rotatable shaft, said magnet holder being adjustably movable with respect to the shaft for varying the angular position of the permanent magnet on said shaft.

43. An assembly as recited in claim 42 further including at least one port extending through the housing to said bore for accessing at least one magnet holder and varying the relative angular position between said at least one magnet holder and said rotatable shaft.

44. A limit switch housing assembly for determining the angular position of a rotatable shaft, comprising:
(a) a housing formed of nonmagnetic material, said housing having a bore extending therethrough for receiving a rotatable shaft;
(b) at least one cavity extending into said housing about the periphery of said bore;
(c) a capsule disposed within said cavity, said capsule encapsulating a magnetically controlled element and a solid state circuit responsive to said magnetically controlled element; and
(d) conductor means for electronically communicating between said solid state circuit and an external location.

45. A limit switch housing assembly for determining the angular position of a rotatable shaft, comprising:
(a) a housing formed of nonmagnetic material, said housing having a bore extending therethrough for receiving a rotatable shaft;
(b) at least one axially extending drilled cavity extending into said housing about the periphery of said bore, one axial end of said cavity being closed with the opposite axial end being open and threaded;
(c) a capsule disposed within said cavity;
(d) a magnetically controlled element encapsulated in said capsule;

(e) a fitting threadably received in the threaded end of said cavity for sealingly closing the open end of the cavity in a watertight explosion proof seal; and (f) conductor means extending through the sealed fitting in the open axial end of said cavity and connected to said magnetically controlled element for electronically communicating between said magnetically controlled element and an external location.

* * * * *